United States Patent
Ericsson et al.

(10) Patent No.: US 7,855,246 B2
(45) Date of Patent: Dec. 21, 2010

(54) PLASTIC PIPE MADE OF POLYOLEFIN

(75) Inventors: Jan Ericsson, Lakeville, MN (US); Jacob John, Eagan, MN (US); Lucas Brickweg, Lakeville, MN (US)

(73) Assignee: Uponor Innovation Ab, Virsbo (SE)

( * ) Notice: Subject to any disclaimer, the term of this patent is extended or adjusted under 35 U.S.C. 154(b) by 0 days.

(21) Appl. No.: 11/950,633

(22) Filed: Dec. 5, 2007

(65) Prior Publication Data

US 2009/0149588 A1 Jun. 11, 2009

(51) Int. Cl.
*C08K 5/13* (2006.01)
(52) U.S. Cl. .................. 524/184; 524/570; 524/330
(58) Field of Classification Search .............. 524/186, 524/570, 330
See application file for complete search history.

(56) References Cited

U.S. PATENT DOCUMENTS

| | | | |
|---|---|---|---|
| 4,579,900 A | 4/1986 | Chatterjee et al. | |
| 4,650,903 A | 3/1987 | Son et al. | |
| 4,839,405 A | 6/1989 | Speelman et al. | |
| 5,260,371 A | 11/1993 | Chen | |
| 5,549,048 A | 8/1996 | Godfrey-Phillips et al. | |
| 6,232,376 B1 | 5/2001 | Tsukada et al. | |
| 6,642,313 B1 | 11/2003 | Kazakov et al. | |
| 7,086,421 B2 | 8/2006 | Backman et al. | |
| 7,132,467 B2 | 11/2006 | Kramer et al. | |
| 7,291,669 B2 | 11/2007 | Botkin et al. | |
| 2004/0025634 A1* | 2/2004 | Nakamura et al. | 75/335 |
| 2005/0209379 A1* | 9/2005 | Botkin et al. | 524/115 |
| 2006/0122308 A1 | 6/2006 | Wermter et al. | |
| 2007/0092675 A1 | 4/2007 | Ho et al. | |
| 2008/0281046 A1* | 11/2008 | Mori et al. | 525/88 |

FOREIGN PATENT DOCUMENTS

| | | |
|---|---|---|
| DE | 2946954 | 6/1981 |
| DE | DD276585 | 3/1990 |
| EP | 0077948 | 10/1982 |
| EP | 0101785 | 8/1987 |
| EP | 0538509 | 4/1996 |
| EP | 1253169 | 10/2002 |
| GB | 2322374 | 8/1998 |
| WO | WO96/08532 | 3/1996 |
| WO | WO2004/009342 | 1/2004 |
| WO | WO 2004/014971 | 2/2004 |
| WO | WO 2004/063268 | 7/2004 |
| WO | WO2005/056657 | 6/2005 |
| WO | WO 2007/059843 | 5/2007 |

OTHER PUBLICATIONS

International Search Report and Written Opinion issued in PCT/IB2008/055089, mailed Mar. 24, 2009.
Steele, T. et al., "Why Does Chlorine Make My Pipe performance Go Down the Drain?", Proceedings the International Polyolefins Conference heldin Houston, TX, Feb. 22-25, 2009, Abstract.
Glass, R. et al., "A Technological Approach to the processing and Long Term Stabilization of HDPE Pipe", Proceedings the International Polyolefins Conference heldin Houston, TX, Feb. 22-25, 2009, Abstract.
Brocca at al., "Identification of Organic Compounds Migrating from Polyethylene Pipelines into Drinking Water," *Water Research*, 36:3675-3680 (2002).

* cited by examiner

*Primary Examiner*—Robert D. Harlan
(74) *Attorney, Agent, or Firm*—Occhiuti Rohlicek & Tsao LLP

(57) ABSTRACT

A plastic pipe is made of a cross-linked polyolefin to be utilized in, but not limited to, potable water applications. Certain antioxidants and stabilizers are added to a process for producing the plastic pipe. The added antioxidants and stabilizers remain as key components in the final plastic pipes, providing superior long term stability and resistance to oxidative degradation, the latter being caused by but not limited to, chlorinated water environments. At least a primary stabilizer is used in the material.

5 Claims, No Drawings

PLASTIC PIPE MADE OF POLYOLEFIN

BACKGROUND OF THE INVENTION

The invention relates to a plastic pipe used for potable water applications, which is made from a cross-linked polyolefin, preferably but not limited to, polyethylene.

It is advantageous and state-of-the-art to use polyolefins, preferably but not limited to, polyethylene, for making plastic pipes applicable to potable water systems and applications. A further advantage is to use cross-linked polyethylene PEX for making pipes for potable water applications. Such advantages include, but are not limited to, long term stability including oxidation resistance to meet current codes and standards for potable water applications, flexibility in installation including a "memory effect", etc.

In many countries, potable water is typically more or less chlorinated, chlorine primarily acting as a disinfectant. Chlorinated water environments exhibit additional challenges to plastic pipe systems. It is well known that extensive exposure to chlorine, and/or any of its water-soluble derivatives, at elevated temperatures and pressures, eventually leads to increased failure rates for plastic piping systems through catalyzed oxidation. It is fundamentally established that chlorine, hypochlorite, etc. reacts with polyethylene in an oxidative type of reaction, resulting in undesired and accelerated polymer (pipe) degradation. Typically, antioxidants are used to overcome the degradative effect of chlorine and/or its derivatives. However, it has been discovered that conventional antioxidants, such as Naugard 76 (supplied by Chemtura), which is equal to Irganox 1076 (supplied by Ciba Specialty Chemicals), typically applied with resins currently being used in the manufacture of plastic pipes, may be rapidly consumed through catalyzed oxidation promoted e.g. by chlorinated water, typically being utilized by an end-user in potable water applications. This effect is highly undesirable and may occur in a relatively short period of time. Thus, an immediate need exists for new types of plastic pipe polymer matrix formulations to address the extractability of antioxidants and stabilizers. This may logically be achieved by lowering the rate of diffusion and, consequently, extraction and depletion of said entities.

US 2007/0092675 discloses stabilized polyethylene materials which maintain the physical properties in chlorinated water environments. The disclosure suggests adding antioxidants, such as hindered phenols, phosphates and metal deactivators, to a polyethylene resin. However, the disclosure states that for many applications it is preferred that the resins not be cross-linked. Thus, a need exists for a new type of solution.

DESCRIPTION OF THE INVENTION

An objective of the present invention is to provide new polyolefin formulations suitable for manufacture of plastic pipe systems, which further provide increased long term stability in residential and commercial potable water applications, particularly when exposed to oxidative environments such as, but not limited to, chlorinated water environments.

In the present invention, plastic pipes are made from a cross-linked polyolefin to be utilized in, but not limited to, potable water applications. Certain antioxidants and stabilizers are added to the process for producing the plastic pipes. Furthermore, the added antioxidants and stabilizers remain as key components in the final plastic pipes, then providing superior long term stability and resistance to oxidative degradation, the latter being caused by but not limited to, chlorinated water environments. At least a primary stabilizer is used in the material.

Preferably, such a primary stabilizer comes from a specific class of sulphur containing hindered phenols, such as but not limited to, thiodiethylene-bis-[3-(3,5-di-tert-butyl-4-hydroxyphenyl)propionate] (Irganox 1035 as supplied by Ciba Specialty Chemicals) and/or 2,2'-thiodiethylene bis[3-(3,5-di-t-butyl-4-hydroxyphenyl)-propionate] (Anox 70 as supplied by Chemtura).

In an embodiment, a second stabilizer is utilized in the present invention, which second stabilizer comes from the classes of hindered amine light stabilizers (HALS), and/or nanoparticles, such as but not limited to, metal oxides.

A large variety of hindered amine light stabilizers are commercially available on the market. Among many others, the present invention utilized Tinuvin 770 and Tinuvin 622 as supplied by Ciba Specialty Chemicals, but not limited thereto, as representative examples of this class of stabilizers. This was to demonstrate the innovative achievement within the framework of the present invention.

In the present invention, nanoparticles are represented by, but are not limited to, zinc oxide as supplied by BykChemie/NanoPhase.

It was concluded in the present invention that the primary stabilizer, provided considerably improved long term stability as demonstrated by, but not limited to, extended exposure to chlorinated water environments under elevated temperatures and pressures.

In addition, the primary stabilizer and the second stabilizers, when combined in the formulations, provided synergistic enhancement effects with regard to improved long term stability as demonstrated by, but not limited to, extended exposure to chlorinated water environments under elevated temperatures and pressures.

Further, it was demonstrated that the synergistic effects obtained by combining the primary stabilizer and the second stabilizer gave major improvements in the process design for the manufacture of PEX-A (polyethylene cross-linked by using peroxide) plastic pipes. This means in particular that new fundamental conditions were created for the design of ratios of all components in the plastic pipe formulations utilized for the manufacture of PEX-A plastic pipes. Ultimately, this gave a major contribution in order to achieve maximum performance for plastic pipes utilized in potable water applications. That is, as far as long term stability and enhanced resistance to oxidative polymer degradation are concerned, for example in chlorinated potable water environments.

Thus, it is novel, advantageous, and innovative to produce cross-linked polyolefinic pipe products useful for potable water applications, providing major improvements in long-term stability and resistance to oxidation by applying the novel pipe formulations presented in this invention.

It will be obvious to a person skilled in the art that as technology advances, the inventive concept may be implemented in various ways. The invention and its embodiments are not limited to the examples described above but may vary within the scope of the claims.

The invention claimed is:

1. A plastic pipe comprising a cross-linked polyethylene, a primary stabilizer, and a second stabilizer, the primary stabilizer being a phenolic stabilizer selected from the group consisting of thiodiethylene-bis-[3-(3,5-di-tert-butyl-4-hydroxyphenyl) propionate], 2,2'-thiodiethylene bis(3-(3,5-di-t-butyl-4-hydroxyphenyl)-propionate], and combinations thereof, and the second stabilizer being a hindered amine light stabilizer.

2. A plastic pipe according to claim 1, comprising nanoparticles.

3. A plastic pipe according to claim 1, wherein the pipe further comprises a combination of second stabilizers including hindered amine light stabilizers and nanoparticles.

4. A plastic pipe according to claim 2, wherein the nanoparticles comprise zinc oxide.

5. A plastic pipe according to claim 3, wherein the nanoparticles comprise zinc oxide.

* * * * *